United States Patent [19]
Walters, Jr.

[11] Patent Number: 5,153,455
[45] Date of Patent: Oct. 6, 1992

[54] TRANSITION-BASED WIRED "OR" FOR VLSI SYSTEMS

[75] Inventor: Donald M. Walters, Jr., Austin, Tex.

[73] Assignee: Advanced Micro Devices, Inc., Sunnyvale, Calif.

[21] Appl. No.: 772,188

[22] Filed: Oct. 7, 1991

[51] Int. Cl.[5] ........................ H03K 17/16; H03K 5/153
[52] U.S. Cl. ................................ 307/443; 307/475; 307/465; 307/353; 307/358
[58] Field of Search ............... 307/443, 465, 468, 475, 307/352, 353, 356, 358, 272.1–272.2

[56] References Cited

U.S. PATENT DOCUMENTS

| | | | |
|---|---|---|---|
| 4,463,272 | 7/1984 | Tucker | 307/358 |
| 4,749,879 | 6/1988 | Peterson et al. | 307/358 |
| 4,866,300 | 9/1989 | Bolk et al. | 307/358 |
| 5,116,342 | 5/1992 | Schmidt et al. | 307/358 |

Primary Examiner—Edward P. Westin
Assistant Examiner—Andrew Sanders
Attorney, Agent, or Firm—Davis Chin

[57] ABSTRACT

A transition-based wired "OR" bus circuit for use on a VLSI system including a common bus line and a plurality of I.C. chips connected to the bus line permits inter-chip communication among the plurality of interconnected I.C. chips upon a digital bus line. The bus circuit includes an output driver stage, a sampling/hold circuit, and control logic circuitry. The control logic circuitry causes a toggle signal on the bus line to be driven to a value in the present cycle to be different from than sampled in the prior sample so as to indicate an assertion. The sampling/hold circuit generates a toggle-based "OR" resultant signal which is maintained at a high logic level only when the value sampled during the present cycle is different from the value sampled in the prior cycle. The bus circuit eliminates the use of any external components, has reduced power consumption, and has a high speed of operation.

20 Claims, 3 Drawing Sheets

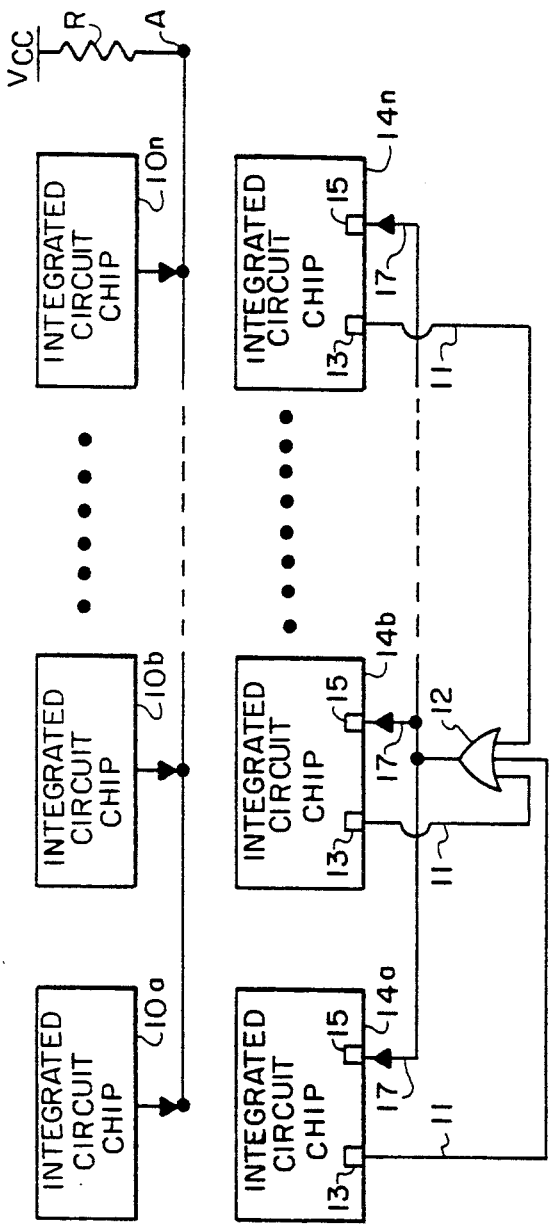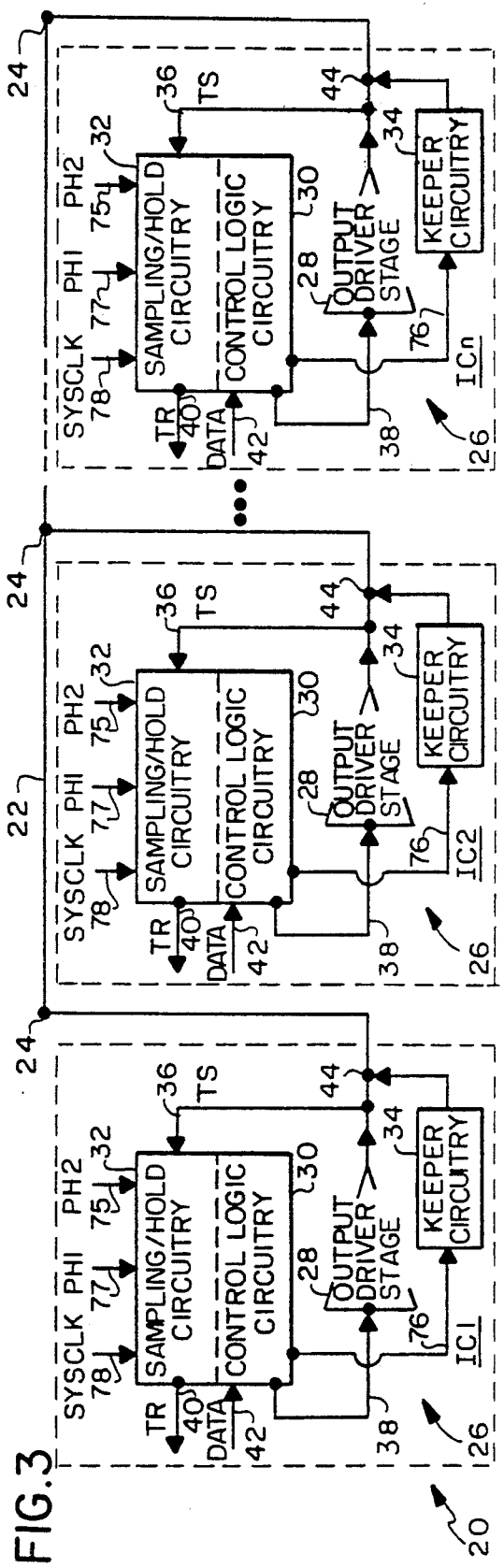
FIG. 1 (PRIOR ART)
FIG. 2 (PRIOR ART)
FIG. 3

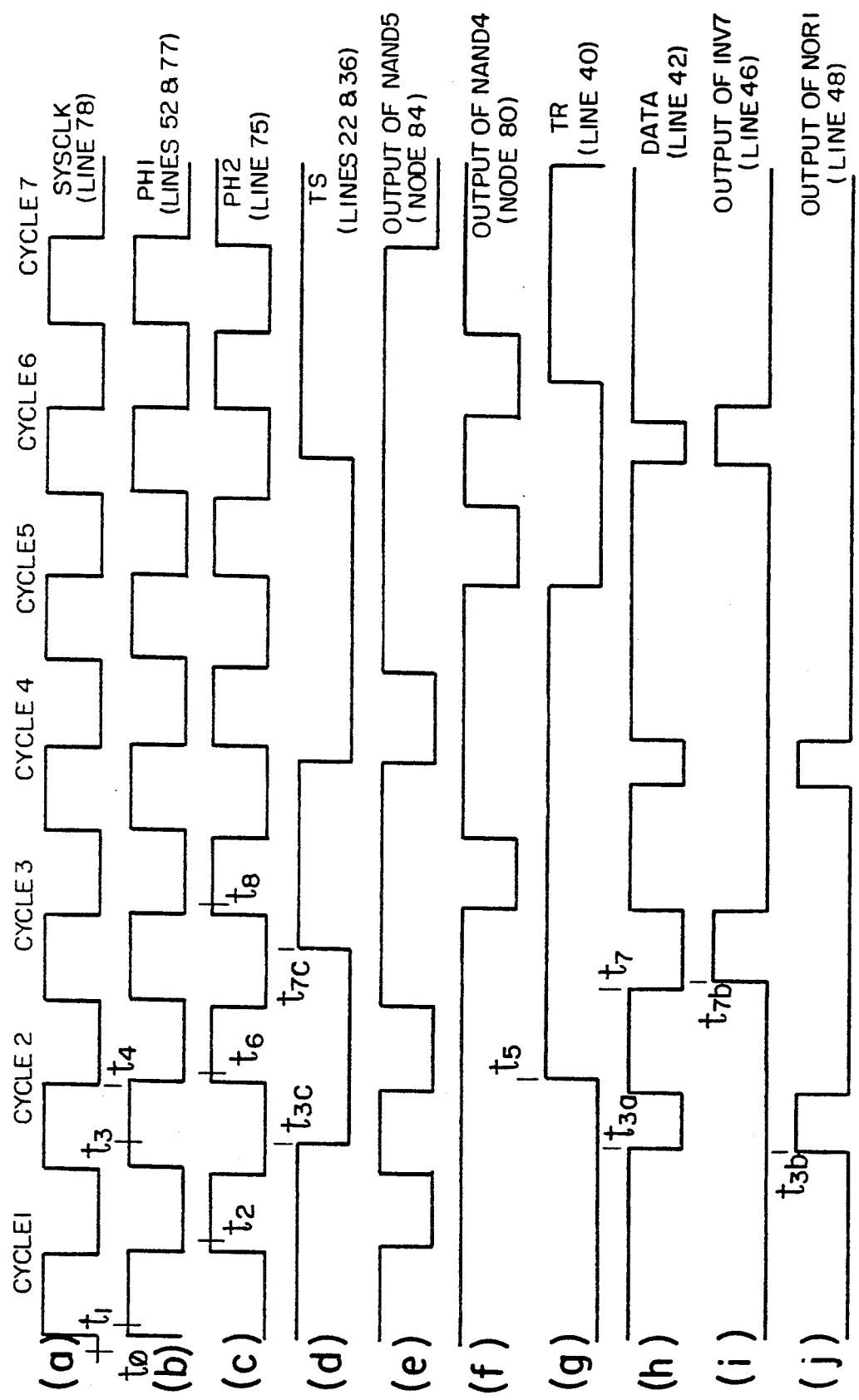

TRANSITION-BASED WIRED "OR" FOR VLSI SYSTEMS

BACKGROUND OF THE INVENTION

This invention relates generally to integrated logic circuits for use on digital communication systems and more particularly, it relates to a transition-based wired "OR" bus circuit which allows interchip communication between numbers of interconnected VLSI (very large scale integration) chips upon a digital bus.

As used herein, wired "OR" logic is defined to mean that any one or ones of all of the interconnected VLSI chips may drive or assert a signal on a common digital bus line while any one or ones of all of the interconnected VLSI chips may receive the asserted signal from the common bus line. There are known heretofore various prior art wired "OR" bus circuits for effecting bused digital communication between interconnected devices. One such prior art wired "OR" bus circuit of FIG. 1 requires the use of an external pull-up resistor R to be connected via a node A to each of the integrated circuit chips 10a, 10b, ... 10n. In order to effectuate the wired "OR" connection, one or more of the chips may be activated so as to pull-down the node A and thus cause the current to flow through the external resistor R. This scheme has the disadvantages of occupying more space due to this external component, high current drains, and large power dissipation.

Another prior art wired "OR" bus circuit is illustrated in FIG. 2. As can be seen, there is required the use of an external logic gate 12 (i.e., OR gate) in which each of the inputs of the logic gate 12 is connected by a plurality of first conductors 11 to a respective output pin 13 of the integrated circuit chip 14a, 14b, ... 14n. Further, the output of the logic gate 12 is fed back to each of the integrated circuit chips via a plurality of second conductors 17 and their respective input pin 15. This prior art approach suffers not only from the use of an external component but also from the number of input/output pins needed in the individual integrated circuit chips and associated number of conductors, which imposes severe restraints.

Thus, it would be desirable to provide an improved wired "OR" bus circuit which eliminates the use of any external components and operates with reduced power dissipation. It would also be expedient to provide a wired "OR" bus circuit which utilizes a single signal between all of the integrated circuit chips.

SUMMARY OF THE INVENTION

Accordingly, it is a general object of the present invention to provide an improved wired "OR" bus circuit which is relatively simple and economical to manufacture and assemble, but yet overcomes the disadvantages of the prior art bus circuits.

It is an object of the present invention to provide an improved wired "OR" bus circuit which eliminates the use of any external components and operates with reduced power dissipation.

It is another object of the present invention to provide a transition-based wired "OR" bus circuit which allows interchip communication between numbers of interconnected VLSI chips upon a digital bus line at high frequencies.

It is still another object of the present invention to provide a transition-based wired "OR" bus circuit which includes an output driver stage, a sampling/hold circuit, and a control logic circuit.

It is still yet another object of the present invention to provide a transition-based wired "OR" bus circuit which includes a keeper circuit for maintaining an internal node either at a high logic level after the internal node has made a low-to-high transition or at a low logic level after the internal node has made a high-to-low transition.

In accordance with these aims and objectives, the present invention is concerned with the provision of a transition-based wired "OR" bus circuit for use on a VLSI system including a common bus line and a plurality of integrated circuit chips connected to the bus line. The bus circuit includes an output driver stage, a sampling/hold circuit, and a control logic circuit. The output driver stage is responsive to a first control signal for generating a transition from a low logic level to a high logic level at an internal output node coupled to the bus line and is responsive to a second control signal for generating a transition from the high logic level to the low logic level at the internal node.

The sampling/hold circuit is responsive to a system clock signal, a first internal clock signal, and a second internal clock signal for sampling a value of a toggle signal on the bus line during a present cycle, for storing a value of a sampled control signal corresponding to the sample of the toggle signal on the bus line during the prior cycle, and for generating a toggle-based "OR" resultant signal. The control logic circuit is responsive to an input assertion signal and the stored value of the sampled control signal for generating the first and second control signals.

The input assertion signal is driven to a low logic level during the time when the first internal clock signal is at a high logic level for causing the toggle signal on the bus line to be driven to a value in the present cycle to be different from that sampled in the prior cycle so as to indicate an assertion. The resultant signal is maintained at a high logic level only when the value sampled during the present cycle of the system clock signal is different from the value sampled in the prior cycle.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 1 is a simplified schematic diagram of a prior art wired "OR" bus circuit;

FIG. 2 is a simplified schematic circuit diagram of another prior art wired "OR" bus circuit;

FIG. 3 is a block diagram illustrating a VLSI system having a plurality of interconnected integrated circuit chips, each chip including a wired "OR" bus circuit constructed in accordance with the principles of the present invention;

FIGS. 5(a)–5(j) are timing diagrams at various points in the circuit of FIG. 4, which are useful in understanding the operation thereof.

DESCRIPTION OF THE PREFERRED EMBODIMENT

Figure 4:
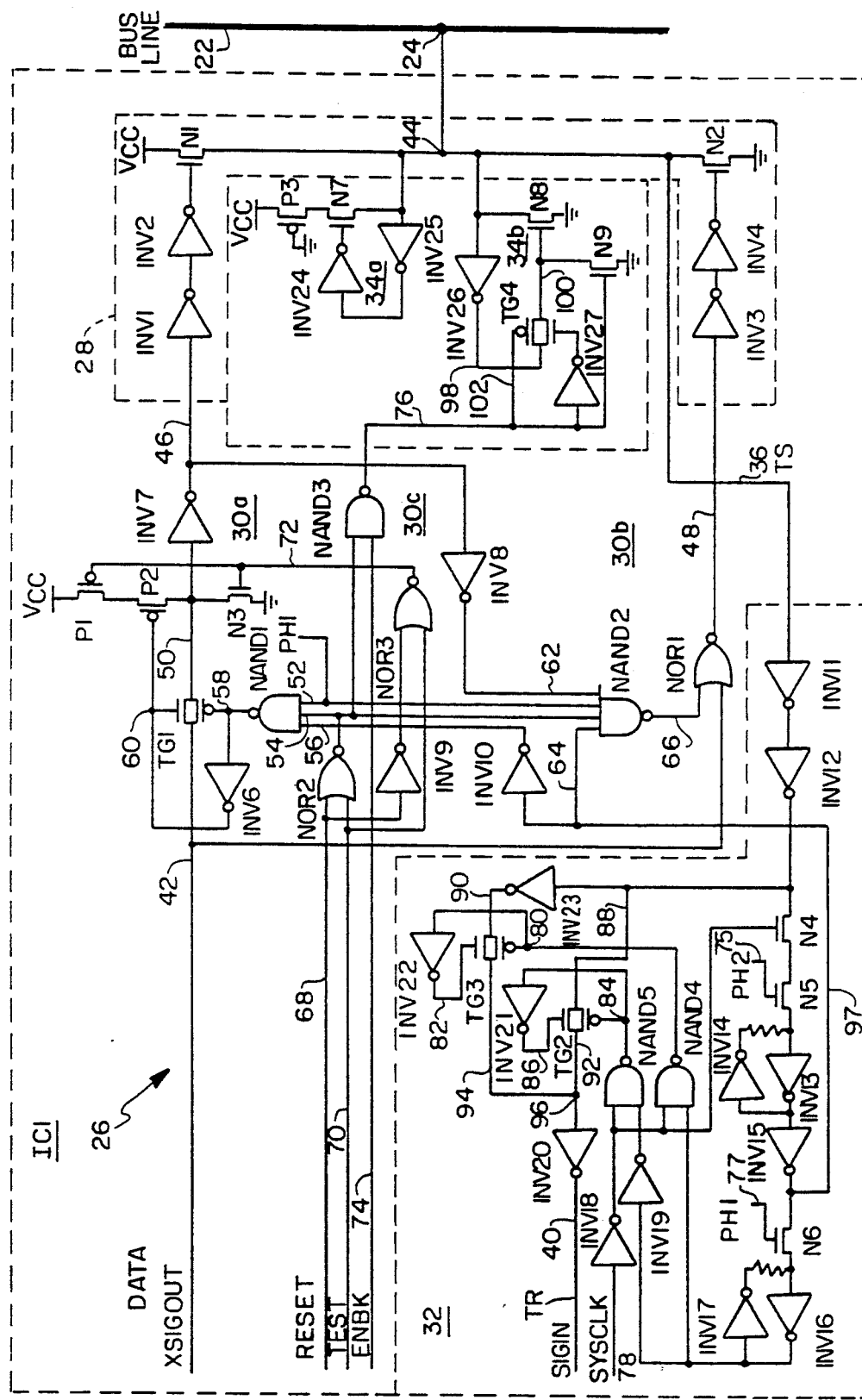
FIG. 4 is a detailed schematic circuit diagram of the wired "OR" bus circuit of the present invention.

Referring now in detail to the drawings, there is shown in FIG. 3 in block diagram form a VLSI system 20 having a plurality of different integrated circuit (I.C.) chips IC1, IC2, ... ICn. Each of the I.C. chips is connected to a single digital bus line 22 at external points or nodes 24 so as to effectuate a wired "OR" interchip communication upon the digital bus line. While each of the I.C. chips is considered to be of a different type of circuit element, such as a central processing unit, memory device, peripheral device, and the like, the I.C. chips may also all be of the same type or any number of mixed combination of like and different circuit elements. Each of the I.C. chips IC1, IC2, ... ICn includes a transition-based wired "OR" bus circuit 26 of the present invention which is comprised of an output driver stage 28, control logic circuitry 30, sampling/hold circuitry 32, and a keeper circuit 34. Since each of the bus circuits 26 is the same, it will be sufficient to discuss only the circuit 26 formed on the integrated circuit IC1.

The output of the output driver stage 28 is coupled to and drives the common bus line 22 via an internal output node 44. The input of the driver stage 28 is coupled to and controlled by control signals on internal line 38 which is connected to the control logic circuitry 30. The sampling/hold circuitry 32 samples the value of a toggle signal TS on the bus line 22 via an internal toggle connection line 36 during a present cycle (N) and compares it with the sampled value of the toggle signal during the previous cycle (N-1). If the comparison of the two samples is different, then a toggle-based "OR" resultant signal TR will be set or maintained at a high or logic "1" level which is generated on line 40. Otherwise, the resultant signal TR will be set to a low or logic "$\phi$" level.

The control logic circuitry 30 receives an input assertion signal DATA on line 42 and a sampled control signal from the sampling/hold circuitry indicative of the value sampled in the prior cycle (N-1). If it is desired that the integrated circuit IC1 be used to drive the bus line, the input assertion signal DATA will be asserted, i.e., DATA=$\phi$. As a result, the control logic circuitry 30 will cause the output driver stage 28 to drive the bus line 22 during the cycle (N) to a value which is different from that which was sampled during the prior cycle (N-1). The output driver stage 28 will cease to drive the bus line 22 before the end of this present cycle (N). Thereafter, the keeper circuitry 34 will serve to maintain this value on the bus line until one or ones of the integrated circuit chips desires to drive or assert the bus line by changing again the value on the bus connection.

In FIG. 4, there is shown a detailed schematic circuit diagram of the wired "OR" bus circuit 26 of the present invention, which may be used in each of the I.C. chips IC1, IC2, ... ICn of FIG. 3. The output driver stage 28 is formed of an N-channel, pull-up MOS transistor N1 and an N-channel, pull-down MOS transistor N2. The drain of the transistor N1 is connected to a supply voltage or potential VCC, which is typically at +5.$\phi$ volts, and the source of the transistor N1 is connected to the internal output node 44 which is coupled to the bus line 22 via the node 24. The drain of the transistor N2 is also connected to the internal output node 44, and the source of the transistor N2 is connected to a ground potential, which is typically at $\phi$ volts. The output driver stage 28 further includes inverters INV1, INV2, INV3 and INV4. The inverter INV1 has its input connected to a line 46 for receiving a first control signal from an output of the control logic circuitry 30 and its output connected to the input of the inverter INV2. The output of the inverter INV2 is connected to the gate or control electrode of the pull-up transistor N1. The inverter N3 has its input connected to a line 48 for receiving a second control signal from another output of the control logic circuitry 30 and its output connected to the input of the inverter INV4. The output of the inverter INV4 is connected to the gate or control electrode of the pull-down transistor N2. It will be noted that the lines 46 and 48 correspond to the single internal line 38 of FIG. 3.

The control logic circuitry 30 includes a pull-up logic circuit 30a, a pull-down logic circuit 30b, and an enable circuit 30c. The pull-up logic circuit 30a is comprised of P-channel MOS transistors P1 and P2, an N-channel MOS transistor N3, a transfer gate TG1, inverters INV6, INV7 and INV10, and a three-input NAND logic gate NAND1. The transistor P1 has its source connected to the supply potential VCC, its gate connected to the gate of the transistor N3, and its drain connected to the source of the transistor P2. The gate of the transistor P2 is connected to the output of the inverter INV6, and the drain of the transistor P2 is connected to the drain of the transistor N3. The transistor N3 has its source connected to the ground potential. The signal-in connection of the transfer gate TG1 is on the line 42 which receives the input assertion signal DATA. The signal-out connection of the transfer gate TG1 is on line 50 which is joined to the common drains of the transistors P2 and N3 and to the input of the inverter INV7. The output of the inverter INV7 provides the first control signal on the line 46. The gate NAND1 has a first input on line 52 for receiving an internal clock signal PH1, a second input on line 54 which is coupled to the enable circuit 30c, and a third input on line 56 which is coupled to the sampling/hold circuitry 32 via the inverter INV10. The output of the gate NAND1 is connected to a first control node 58 of the transfer gate TG1 and to a second control node 60 of the transfer gate TG1 via the inverter INV6. The transfer gate TG1 is a conventional transmission gate and is formed of a P-channel MOS transistor and an N-channel MOS transistor. The gate of the P-channel transistor defines the first control node 58, and the gate of the N-channel transistor defines the second control node 60.

The pull-down logic circuit 30b is comprised of inverter INV8, a four-input NAND logic gate NAND2, and a NOR logic gate NOR1. The inverter INV8 has its input connected to the output of the inverter INV7 on the line 46 for receiving the first control signal and its output connected to a first input on line 62 of the gate NAND2. The gate NAND2 has also a second input for receiving the internal clock signal PH1 via the line 52, a third input which is coupled to the enable circuit 30c via the line 54, and a fourth input on line 64 which is coupled to the sampling/hold circuitry 32. The output of the gate NAND2 is connected via line 66 to a first input of the gate NOR1. A second input of the gate NOR1 is connected to the line 42 for receiving the input assertion signal DATA. The output of the gate NOR1 provides the second control signal on the line 48.

The enable circuit 30c is comprised of NOR logic gates NOR2 and NOR3, inverter INV9, and a NAND logic gate NAND3. The gate NOR2 has a first input on line 68 for receiving a signal RESET which normally is at a low or logic "φ" level and a second input on line 70 for receiving a signal TEST which is also normally at the low logic level. When it is desired to reset initially the internal output node 44 to a high logic state after power is applied, the signal RESET is made to go momentarily to a high or logic "1" level. If it is desired to test the system, the signal TEST will be made to a high logic level. The output of the gate NOR2 is connected to the second input of the gate NAND1 on the line 54 and to a first input of the gate NAND3. The gate NOR3 has a first input coupled to the line 68 for also receiving the signal RESET via the inverter INV9 and a second input connected to the line 70 for receiving also the signal TEST. The output of the gate NOR3 is connected via line 72 to the common gates of the transistors P1 and N3. The gate NAND3 has a second input on line 74 for receiving a signal ENBK which is used to enable the keeper circuitry 34 as will be explained later. When it is desired to enable the keeper circuitry, the signal ENBK is set to a high logic level. The output of the gate NAND3 provides a keeper control signal on line 76.

The sampling/hold circuitry 32 is comprised of inverters INV11 through INV23, P-channel MOS transistors N4–N6, transfer gates TG2 and TG3, and NAND logic gates NAND4 and NAND5. The inverter INV11 has its input connected to the connection line 36 for receiving the toggle signal TS on the bus line 22 via the nodes 24 and 44. The inverter INV12 has its input connected to the output of the inverter INV11 and its output connected to one of the main electrodes (drain or source) of the transistor N4. The other one of the main electrodes (source or drain) of the transistor N4 is connected to one of the main electrodes of the transistor N5. The output of the inverter INV13 is tied to the input of the inverter INV14, and the output of the inverter INV14 is tied to the input of the inverter INV13 so as to form a first latch. The input of the inverter INV13 defining the input of the first latch is joined to the other main electrode of the transistor N5. The gate of the transistor N5 is connected to receive an internal clock signal PH2 on line 75, which is a complement of the internal clock signal PH1. The output of the inverter INV13 defines the output of the first latch and is joined to the input of the inverter INV15.

The output of the inverter INV15 is connected to one of the main electrodes of the transistor N6. The output of the inverter INV16 is connected to the input of the inverter INV17, and the output of the inverter INV17 is connected to the input of the inverter INV16 so as to form a second latch. The input of the inverter INV16 defines the input of the second latch and is joined to the other main electrode of the transistor N6. The gate of the transistor N6 is connected to receive the internal clock signal PH1 on line 77. The output of the inverter INV16 defines the output of the second latch and is fed to a first input of the gate NAND4 and to a first input of the gate NAND5 via the inverter INV19. The inverter INV18 has its input connected to line 78 for receiving a system clock signal SYSCLK. The output of the inverter INV18 is connected to a second input of the gate NAND4 and to a second input of the gate NAND5. The output of the gate NAND4 is connected to a first control node 80 of the transfer gate TG3 and to a second control node 82 of the transfer gate TG3 via the inverter INV22. The output of the gate NAND5 is tied to a first control node 84 of the transfer gate TG2 and to a second control node 86 of the transfer gate TG2 via the inverter INV21.

The transfer gates TG2 and TG3 are likewise conventional transmission gates and are constructed similar to the transmission gate TG1. The output of the inverter INV12 is also fed to the signal-in connection of the transmission gate TG2 on the line 88 and to the signal-in connection of the transfer gate TG3 on line 90 via the inverter INV23. The signal-out connection of the transfer gate TG2 on line 92 and the signal-out connection of the transfer gate TG3 on line 94 are commonly tied together at node 96 and is further tied to the input of the inverter INV20. The output of the inverter INV20 provides the toggle-based "OR" resultant signal TR on the line 40. The output of the inverter INV15 defining the sampled control signal on line 97 is also fed to the fourth input of gate NAND2 in the pull-down logic circuit 30b via the line 64 and to the third input of the gate NAND1 in the pull-up logic circuit 30a via the inverter INV10 and the line 56.

The keeper circuitry 34 is formed of an upper keeper portion 34a and a lower keeper portion 34b. The upper keeper portion 34a is comprised of a P-channel MOS transistor P3, an N-channel MOS transistor N7, and inverters INV24 and INV25. The transistor P3 has its source connected to the supply potential VCC, its gate connected to the ground potential, and its drain connected to the drain of the transistor N7. The transistor N7 has its gate connected to the output of the inverter INV24 and its source connected to the input of the inverter INV25 and the internal output node 44. The output of the inverter INV25 is tied to the input of the inverter INV24.

The lower keeper portion 34b is comprised of N-channel transistors N8, N9; inverters INV26 and INV27; and a transfer gate TG4. The output of the inverter INV26 is connected to the signal-in connection of the transfer gate TG4 on line 98. The transistor N8 has its drain connected to the input of the inverter INV26 and to the internal output node 44. The gate of the transistor N8 is connected to the signal-out connection of the transfer gate TG4 on line 100 and to the drain of the transistor N9. The sources of the transistors N8 and N9 are connected to the ground potential. The keeper control signal on the line 76 from the gate NAND3 of the enable circuit 30c is fed to a first control node of the transfer gate TG4, to a second control node of the transfer gate TG4 via the inverter INV27, and to the gate of the transistor N9. Again, the transfer gate TG4 is a conventional transmission gate and is constructed similar to the transmission gate TG1.

In order to provide an understanding of the operation of the transition-based "OR" bus circuit 26 of the present invention, reference is now made to FIGS. 5(a)–5(j) of the drawings which illustrate the waveforms at various points in the bus circuit of FIG. 4. Initially, it is assumed that the signal RESET and the signal TEST are both at a low or logic "φ" level. Further, it is assumed that the signal ENBK is at a high or logic "1" level and that the bus line 22 (also nodes 24 and 44) has been maintained for a relatively long time at a high logic level prior to time tφ. The system clock signal SYSCLK is illustrated in FIG. 5(a) and is applied to the line 78 and received by a system clock generator circuit (not shown) for generating the internal clock signals PH1 and PH2 shown in FIGS. 5(b) and 5(c), respectively. It will be noted that the internal clock signal PH1 is delayed slightly with respect to the system clock signal SYSCLK and that the internal clock signal PH2 is a complement of the signal PH1. The internal clock signals PH1 and PH2 are also shown as being non-overlapping. In other words, when the signals SYSCLK and PH1 are at a high logic level the internal clock signal PH2 is at a low logic level and when the signals SYSCLK and PH1 are at a low logic level the signal PH2 is at a high logic level. The toggle signal TS on the bus line 22 is illustrated in FIG. 5(d) and is at the high logic level at the time tφ.

The toggle resultant signal TR is to be driven to the high logic level only when the value sampled of the toggle signal TS in a current cycle (N) is different from the value sampled of the toggle signal in a previous cycle (N-1). Otherwise, the toggle resultant signal TR is to be maintained at a logic "φ" level. Thus, the toggle resultant signal TR, as illustrated in FIG. 5(g), will be at a low logic level since the toggle signal TS has been assumed to be maintained at the high logic level for some time prior to the time tφ. It can also be seen that this toggle signal TS being at the high logic level will have been passed through the transistors N4 and N5, the first latch and the inverter INV15 when the system clock signal SYSCLK was low and the internal clock signal PH2 was high. Thus, the output of the inverter INV15 defining the sampled control signal on line 97 will be holding or storing a high logic level, which corresponds to the value sampled during a previous cycle. When the internal clock signal PH1 was high prior to the time tφ, this high level will have been passed through the transistor N6, second latch and inverter INV19. Therefore, the first input of the gate NAND4 will be at a low level and the first input of the gate NAND5 will be at a high level. The next time the system clock signal SYSCLK goes low prior to the time tφ, the output of the gate NAND5 will also go low so as to cause the high at the output of the inverter INV12 to pass through the transfer gate TG2 and the inverter INV20. Accordingly, it has been verified that the toggle resultant signal TR will indeed be at the low level initially at the time tφ.

At the time t1, when the internal clock signal PH1 goes high the value sampled (high level) on the previous cycle and stored at the output of the inverter INV15 will present a low level to the first input of the gate NAND4 and will present a high level to the first input of the gate NAND5. At time t2, when the internal clock signal PH2 goes high the value of the toggle signal TS for the current or cycle1 of the system clock signal will be sampled. Again, a high level will be stored at the output of the inverter INV15. Simultaneously, the system clock signal being low at the time t2 will cause the output of the gate NAND5 to go low. The output of the gate NAND5 is illustrated in FIG. 5(e). This will, in turn, cause the transmission gate TG2 to close. Thus, the high from the inverter INV12 will again be inverted by the inverter INV20 and the resultant signal TR will stay at the low level at the time t2. The resultant signal TR is illustrated in FIG. 5(g).

As can be seen from FIG. 5(h), it will be noted that the assertion signal was not asserted (i.e., DATA=1) during the time t1. During the time t1 when the internal clock signal PH1 is high the output of gate NAND2 will go low because the high stored on the previous cycle at the output of the inverter INV5 will be applied on the line 64 and the line 62 will already be at the high level. However, since the input assertion signal is at the high level, the output of the gate NOR1 defining the second control signal will be low and thus render the transistor N2 to be non-conductive. Simultaneously, during the time t1 the output of gate NAND1 will be high since the high from the inverter INV15 will be inverted by the inverter INV10 to cause a low on the line 56. Therefore, the transfer gate TG1 will be open and the output of the inverter INV7 defining the first control signal will be low (due to the conduction of transistor P2) so as to render the transistor N1 to be non-conductive. Accordingly, the high level on the internal output node 44 will be maintained by the upper keeper circuit portion 34a since the transistor N7 will be turned on. It will also be noted that the lower keeper portion 34b is turned off since the transistor N8 is not conductive.

Now, it will be assumed that one or more of the integrated circuit chips IC1, IC2, . . . ICn desires to drive or assert the bus line 22. In order to assert, the toggle signal TS on the bus line 22 must be driven to a value in the present cycle or cycle2 of the system clock signal that is different from the value sampled in the previous cycle or cycle1. Thus, the toggle signal TS must be driven to a low level at time t3c. For ease of discussion, it will be further assumed that it is chip IC1 which is asserting. In order to achieve this result, it is constrained that the input assertion signal DATA be asserted (DATA=φ) only during the time when the internal clock signal PH1 is high and is otherwise at a high level. Accordingly, when the signal PH1 is high at time t3 the signal DATA is made to go low at time t3a. Since the transfer gate TG1 will be open at time t3 due to the output of the gate NAND1 staying high, the first control signal on the line 46, as illustrated in FIG. 5(i), will be low due to the conduction of the transistor P2. Simultaneously, the output of the gate NAND2 will go low at the time t3 since all of its inputs will be high. As a result, the second control signal on the line 48, as shown in FIG. 5(j), will go high at the time t3b which turns on the transistor N2 thereby pulling down the high level at the node 44. Consequently, the toggle signal TS will go low at the time t3c.

Further, since the signal PH1 will still be high at the time t3b, the previous value sampled and stored at the output of the inverter INV5 (i.e., high level) will be passed through the transistor N6. Thus, the output of the inverter INV19 will now be high. When the system clock signal SYSCLK becomes low at the time t4, the output of the gate NAND5 will go low so as to turn on the transfer gate TG2. This will allow the low on the node 44 to be passed therethrough and cause the resultant signal TR on the line 40 to go high at the time t5. This agrees with the constraint that the resultant signal TR is to be made high only when the value sampled in the cycle (N) or cycle2 is different from that sampled in the cycle (N-1) or cycle1.

Shortly after the value has been sampled during cycle2 of the system clock signal taken at the time t4, the signal PH2 will go high at time t6. This permits the value sampled (i.e., low level) for the cycle2 to be stored at the output of the inverter INV15. In order to effect another assertion on the line 36 at the time t7c, by causing the toggle signal TS to be driven to a value in cycle3 that differs from that sampled in cycle2, the assertion signal DATA is made to be low at the time t7. Since the signal PH1 is high at time t7, the output of gate NAND1 will go low since all of its inputs will be high and the transfer gate TG1 will be turned on. This allows the assertion signal DATA to be passed through the transfer gate TG1, and the first control signal on line 46 at time t7b will be high so as to render the transistor N1 conductive. It will be noted that the output of the gate NAND2 will be rendered high since the input on line 64 will be low. Thus, the second control signal will be low and the transistor N2 will be turned off.

Simultaneously, the low level at the output of the inverter INV15 will be passed through the transistor N6 and a high will appear on the first input of the gate NAND4. When the system clock signal is low and the internal clock signal PH2 goes high at time t8, the output of gate NAND4 will go low so as to turn on the transfer gate TG3. Thus, the high at the output of the inverter INV12 during the third cycle of the system clock will be passed through the transfer gate TG3, causing the resultant signal TR to remain high.

It should be apparent that a similar analysis can be done for the remaining cycles 4 through 7 of the system clock signal so as to obtain the waveform of the toggle signal TS shown in FIG. 5(d) and the toggle resultant signal TR shown in FIG. 5(g). For purposes of illustration, it can be seen that additional assertions were made during the cycle4 and cycle6, but no assertions were made during the cycle5 and cycle7 of the system clock signal. Briefly stated, the input assertion signal is driven to a low logic level during the time when the system clock signal SYSCLK or the first internal clock signal PH1 is at a high logic level for causing the toggle signal TS on the bus line to be driven to a value in the present cycle (N) to be different from that sampled in the prior cycle (N-1) so as to indicate an assertion. In other words, if a high logic level was sampled in the prior cycle the pull-down logic circuit 30b will cause the transistor N2 in the output driver stage 28 to be turned on via the second control signal on the line 48. As a result, the high logic level will be pulled down to the low level. On the other hand, if a low level was sampled in the prior cycle, the pull-up logic circuit 30a will cause the transistor N1 in the output driver stage 28 to be turned on via the first control signal on the line 46 when the input assertion signal is driven to a low logic level. This will, in turn, cause the toggle signal to be pulled up to the high logic level.

Further, the resultant signal TR on the line 40 will be maintained at a high logic level only when the value sampled during the present cycle (N) of the system clock signal is different from the value sampled in the prior cycle (N-1). In other words, if the output of the inverter INV12 is at a low logic level corresponding to the present cycle and the output of the inverter INV15 is at a high logic level corresponding to the prior cycle, the gate NAND5 will cause the transfer gate TG2 to turn on so as to present the resultant signal to have a high level. Also, if the output of the inverter INV12 is at a low level for the present cycle and the output of the inverter INV15 is at a high level for the previous cycle, the gate NAND4 will cause the transfer gate TG3 to turn on so as to again present a high level for the resultant signal TR on the line 40. In the other cases where the value sampled during the present cycle and the previous cycle are the same (i.e., both high or low), the resultant signal TR will be at a low level.

From the foregoing detailed description, it can thus be seen that the present invention provides a transition-based wired "OR" bus circuit for use on a VLSI system including a common bus line and a plurality of I.C. chips connected to the bus line which is formed of an output driver stage, a sampling/hold circuit and a control logic circuit. The wired "OR" bus circuit of the present invention eliminates the use of any external components, has reduced power consumption, and has a high speed of operation. Further, dependent upon the particular applications, a keeper circuit may be provided on only one of the I.C. chips or on each of the I.C. chips for maintaining a particular logic level on the bus line.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. For use on a VLSI system including a common bus line and a plurality of I.C. chips connected to the bus line, a transition-based wired "OR" bus circuit comprising:

output driver stage means (28) being responsive to a first control signal for generating a transition from a low logic level to a high logic level at an internal output node coupled to the bus line and being responsive to a second control signal for generating a transition from the high logic level to the low logic level at the internal output node;

sampling/hold circuit means (32) being responsive to a system clock signal, a first internal clock signal, and a second internal clock signal for sampling a value of a toggle signal on the bus line during a present cycle (N), for storing a value of a sample control signal corresponding to the sample of the toggle signal on the bus line during the prior cycle (N-1), and for generating a toggle-based "OR" resultant signal;

control logic circuit means (30) being responsive to an input assertion signal and the stored value of the sample control signal for generating said first and second control signals;

said input assertion signal being driven to a low logic level during the time when the first internal clock signal is a high logic level for causing the toggle signal on the bus line to be driven to a value in the present cycle to be different from that sampled in the prior cycle so as to indicate an assertion; and said resultant signal being maintained at a high logic level only when the value sampled during the present cycle is different from the value sampled in the prior cycle.

2. A bus circuit as claimed in claim 1, wherein said output driver stage means (28) comprises a pull-up transistor (N1) and a pull-down transistor (N2), said pull-up transistor (N1) having one of its main electrodes connected to a supply potential, its other main electrode connected to the internal node and its control electrode coupled to receive said first control signal, said pull-down transistor (N2) having one of its main electrodes connected to the internal node, its other main electrode connected to a ground potential and its control electrode coupled to receive said second control signal.

3. A bus circuit as claimed in claim 2, wherein said pull-up transistor (N1) is an N-channel MOS transistor.

4. A bus circuit as claimed in claim 3, wherein said pull-down transistor (N2) is an N-channel MOS transistor.

5. A bus circuit as claimed in claim 1, wherein said sampling/hold circuit means (32) comprises first latch means coupled to said bus line for sampling the value of the toggle signal during the present cycle when said second internal clock signal is at a high logic level and for storing the value sampled during the present cycle when said first internal clock signal is at a high logic level, second latch means coupled to said first latch means for sampling the value of the toggle signal stored in said first latch during the previous cycle when said first internal clock signal is at the high logic level and for storing the value sample corresponding to the previous cycle when said second internal clock signal is at the high logic level, and first logic means for performing an exclusive "OR" function on the value sampled of the toggle signal during the present cycle and the value sampled of the toggle signal during the previous cycle when the system clock signal is at a low logic level so as to generate the resultant signal.

6. A bus circuit as claimed in claim 5, wherein said first latch means includes a first N-channel MOS transistor (N4), a second N-channel MOS transistor (N5), and first through third inverters (INV13, INV14, INV15), said first transistor (N4) having one of its main electrodes coupled to said bus line and its gate coupled to receive the system clock signal, said second transistor (N5) having one of its main electrodes coupled to the other one of the main electrodes of said first transistor (N4) and its gate coupled to receive the second internal clock signal, said first inverter (INV13) having its input coupled to the other one of the main electrodes of said second transistor (N5) and to the output of said second inverter (INV14), said first inverter (INV13) having its output coupled to the input of said second inverter (INV14) and to the input of said third inverter (INV15), said first and second inverters defining a first latch, said third inverter having its output providing the sampled control signal indicative of the value sampled of the toggle signal during the previous cycle.

7. A bus circuit as claimed in claim 6, wherein said second latch means includes a third N-channel MOS transistor (N6) and fourth and fifth inverters (INV16, INV17), said third transistor (N6) having one of its main electrodes coupled to the output of said third inverter (INV15) and its gate coupled to receive the first internal clock signal, said fourth inverter (INV16) having its input coupled to the other main electrode of said third transistor (N6) and to the output of said fifth inverter (INV17), said fourth inverter (INV16) having its output coupled to the input of said fifth inverter (INV17), said fourth and fifth inverters defining a second latch.

8. A bus circuit as claimed in claim 7, wherein said first logic means includes a first NAND logic gate (NAND5) having first and second inputs and an output; a first transfer gate (TG2) having first and second control nodes, a signal-in connection; and a signal-out connection, a second NAND logic gate (NAND4) having first and second inputs and an output; and a second transfer gate (TG3) having first and second control nodes, a signal-in connection, and a signal-out connection, said first logic gate (NAND5) having its first input coupled to the output of said fourth inverter (INV16) via a sixth inverter (INV19), its second input connected to receive the system clock signal via a seventh inverter (INV18), and its output coupled to the first and second control nodes of said first transfer gate (TG2), said second gate (NAND4) having its first input connected to the output of said fourth inverter (INV16), its second input connected to receive the system clock signal via the seventh inverter (INV18) and its output coupled to the first and second control nodes of said second transfer gate (TG3), the signal-in connection of said first transfer gate (TG2) being coupled to the bus line and the signal-in connection of said second transfer gate (TG3) being coupled to the bus line via an eighth inverter (INV23), the signal-out connection of said first and second transfer gates (TG2, TG3) being connected together and to the input of a ninth inverter (INV20), the output of said ninth inverter providing the resultant signal.

9. A bus circuit as claimed in claim 1, wherein said control logic means (30) includes pull-up logic means (30a) for generating said first control signal to have a high logic level only when said input assertion signal is at the low logic level and the value stored for the sampled control signal is at the low logic level.

10. A bus circuit as claimed in claim 9, wherein said pull-up logic means (30a) includes a first NAND logic gate (NAND1) having first and second inputs and an output; a transmission gate (TG1) having first and second control nodes, a signal-in connection, and a signal-out connection; first and second P-channel MOS transistors (P1, P2); an N-channel MOS transistor (N3); and first through third inverters (INV6, INV7, INV10), said first gate (NAND1) having its first input coupled to receive said first internal clock signal, its second input coupled to receive the stored value of the sample control signal via the first inverter (INV10), and its output connected to said first control node and to said second control node via the second inverter (INV6) of said transmission gate (TG1), said first P-channel transistor (P1) having its source connected to a supply potential, and its drain connected to the source of said second P-channel transistor (P2), said second P-channel (P2) having its gate connected to the output of said second inverter (INV6), its drain connected to the signal-out connection of the transfer gate (TG1) and to the drain of said N-channel transistor (N3), said N-channel transistor (N3) having its gate connected to a reset/test signal and its source connected to a ground potential, said third inverter (INV7) having its input connected to the signal-out connection of the transfer gate (TG1) and its output providing said first control signal, the signal-in connection of said transfer gate (TG1) being connected to receive said input assertion signal.

11. A bus circuit as claimed in claim 10, wherein said control logic means (30) further includes pull-down logic means (30b) for generating said second control signal to have a high logic level only when said input assertion signal is at the low logic level and said value stored for the sample control signal is at the high logic level.

12. A bus circuit as claimed in claim 11, wherein said pull-down logic means (30b) includes a second NAND logic gate (NAND2) having first, second and third inputs and an output; a NOR logic gate (NOR1) having first and second inputs and an output; and a fourth inverter (INV8), said second gate (NAND2) having its first input coupled to receive said first internal clock signal, its second input coupled to receive the output of said third inverter (INV7) via said fourth inverter (INV8), its third input coupled to receive the sampled control signal and its output connected to the first input of said gate (NOR1), said NOR gate (NOR1) having its second input coupled to receive said input assertion signal and its output providing said second control signal.

13. A bus circuit as claimed in claim 1, further comprising keeper circuit means (34) having an upper keeper portion (34a) for maintaining said internal output node at the high logic level after the internal node has made the low-to-high transition and having a lower keeper portion (34b) for maintaining said internal output node at the low logic level after the internal node has made the high-to-low transition.

14. A bus circuit as claimed in claim 13, wherein said upper keeper portion (34a) is formed of a P-channel MOS transistor (P3) and N-channel MOS transistor (N7), and first and second inverters (INV24, INV25), said P-channel transistor (P3) having its source connected to a supply potential, its gate connected to a ground potential, and its drain connected to the drain of said N-channel transistor (N7), said N-channel transistor (N7) having its gate connected to the output of said first inverter (INV24) and its source connected to the input of said second inverter (INV25), said second inverter (INV25) having its input also connected to the internal output node and its output connected to the input of said first inverter (INV24).

15. A bus circuit as claimed in claim 14, wherein said lower keeper circuit portion (34b) is formed of a second N-channel MOS transistor (N8); a third N-channel MOS transistor (N9); a transfer gate (TG4) having first and second control nodes, a signal-in connection, and a signal-out connection; third and fourth inverters (INV26, INV27), said second N-channel transistor (N8) having its drain connected to the internal output node and to the input of said third inverter (INV26), said second N-channel channel transistor (N8) having its gate connected to the drain of said third N-channel transistor (N9) and its source connected to the ground potential, said third N-channel transistor (N9) having its gate coupled to receive an enable signal and its source connected to the ground potential, said transfer gate (TG4) having its first control node connected to receive said enable signal and its second control node connected to receive said enable signal via said fourth inverter (INV27), said transfer gate (TG4) having its signal-in connection connected to the output of said third inverter (INV26) and its signal-out connection connected to the gate of said second N-channel transistor (N8).

16. For use on a VLSI system including a common bus line and a plurality of I.C. chips connected to the bus line, a transition-based wired "OR" bus circuit comprising:

output driver stage means (28) being responsive to a first control signal for generating a transition from a low logic level to a high logic level at an internal output node coupled to the bus line and being responsive to a second control signal for generating a transition from the high logic level to the low logic level at the internal output node;

first logic circuit means (32) for performing an exclusive "OR" function on a first logic value corresponding to a sample of a toggle signal on said bus line during a present cycle and a second logic value corresponding to a sample of the toggle signal on said bus line during the cycle prior to the present cycle so as to generate a toggle-based "OR" resultant signal;

said resultant signal being maintained at a high logic level only when the value sampled during the present cycle is different from the value sampled in the prior cycle;

second logic means (30a) for performing an exclusive "OR" function on a third logic value corresponding to an input assertion signal and the complement of said second logic value corresponding to the sampled value of the toggle signal during the prior cycle so as to generate said first control signal;

said input assertion signal being driven to a low logic level for causing the toggle signal on the bus line to be driven to a value in the present cycle to be different from that sampled in the prior cycle so as to indicate an assertion; and third logic circuit means (30b) for performing an exclusive "OR" function on the third logic value corresponding to the input assertion signal and said second logic value corresponding to the sampled value of the toggle signal during the prior cycle so as to generate said second control signal.

17. A bus circuit as claimed in claim 16, wherein said control logic means (30) includes pull-up logic means (30a) for generating said first control signal to have a high logic level only when said input assertion signal is at the low logic level and the value stored for the sampled bus line signal is at the low logic level.

18. A bus circuit as claimed in claim 16, wherein said pull-up logic means (30a) includes a first NAND logic gate (NAND1) having first and second inputs and an output; a transmission gate (TG1) having first and second control nodes, a signal-in connection, and a signal-out connection; first and second P-channel MOS transistors (P1, P2); an N-channel MOS transistor (N3) and first through third inverters (INV6, INV7, INV10), said gate (NAND1) having its first input coupled to receive said first internal clock signal, its second input coupled to receive the stored value of the sampled bus line signal via the first inverter (INV10), and its output connected to said first control node and to said second control node via the second inverter of said transmission gate (TG1), said first P-channel transistor (P1) having its gate connected to the gate of said N-channel transistor (N3), its source connected to a supply potential, and its drain connected to the source of said second P-channel transistor (P2), said second P-channel (P2) having its gate connected to the output of said second inverter (INV6), its drain connected to the signal-out connection of the transfer gate (TG1) and to the drain of said N-channel transistor (N3), said N-channel transistor (N3) having its gate connected to a reset/test signal and its source connected to a ground potential, said third inverter (INV7) having its input connected to the signal-out connection of the transfer gate (TG1) and its output providing said first control signal, the signal-in connection of said transfer gate (TG1) being connected to receive said input assertion signal.

19. A bus circuit as claimed in claim 18, wherein said control logic means (30) further includes pull-down logic means (30b) for generating said second control signal to have a high logic level only when said input assertion signal is at the low logic level and said value stored for the sampled bus line signal is at the high logic level.

20. A bus circuit as claimed in claim 19, wherein said pull-down logic means (30b) includes a second NAND logic gate (NAND2) having first, second and third inputs and an output; a NOR logic gate (NOR1) having first and second inputs and an output; and a fourth inverter (INV8), said second gate (NAND2) having its first input coupled to receive said first internal clock signal, its second input coupled to receive the output of said third inverter (INV7) via said fourth inverter (INV8), its third input coupled to receive the sampled bus line signal and its output connected to the first input of said gate (NOR1), said NOR gate (NOR1) having its second input coupled to receive said input assertion signal and its output providing said second control signal.

* * * * *